US007301863B2

(12) United States Patent
Yeh et al.

(10) Patent No.: US 7,301,863 B2
(45) Date of Patent: Nov. 27, 2007

(54) METHOD AND DEVICE FOR CANCELING A LAND-GROOVE OFFSET COMPONENT OF A FOCUSING ERROR SIGNAL IN AN OPTICAL STORAGE SYSTEM

(75) Inventors: Hsin-Chung Yeh, Taipei Hsien (TW); Jin-Chuan Hsu, Hsin-Chu Hsien (TW); Yung-Chih Li, Taipei Hsien (TW); Chao-Hsing Tseng, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 560 days.

(21) Appl. No.: 11/009,360

(22) Filed: Dec. 9, 2004

(65) Prior Publication Data

US 2005/0185538 A1 Aug. 25, 2005

(30) Foreign Application Priority Data

Feb. 23, 2004 (TW) .............................. 93104427 A (51) Int. Cl.
*G11B 7/00* (2006.01)
(52) U.S. Cl. .................................. 369/44.32; 369/53.28
(58) Field of Classification Search ..................... None
See application file for complete search history.

(56) References Cited

U.S. PATENT DOCUMENTS

| 4,747,089 A | * | 5/1988 | Eguchi et al. | ............ | 369/44.34 |
| 5,199,011 A | * | 3/1993 | McDonald et al. | ...... | 369/44.29 |
| 2003/0048706 A1 | * | 3/2003 | Kobayashi | ............... | 369/44.26 |
| 2004/0125710 A1 | * | 7/2004 | Hong et al. | .............. | 369/44.32 |

\* cited by examiner

*Primary Examiner*—Paul W. Huber
(74) *Attorney, Agent, or Firm*—Thomas, Kayden, Horstemeyer & Risley (57) ABSTRACT

A device for canceling a land-groove offset component of a focusing error signal in an optical storage system includes first and second circuits, and an adder. The first circuit processes a radio (or wobble) frequency ripple signal to obtain a first processed signal that is multiplied by a first gain value ($G_1$) so as to result in a first signal. The second circuit processes a tracking error signal to obtain a second processed signal that is multiplied by a second gain value ($G_2$) so as to result in a second signal. The adder is coupled to the first and second circuits, and adds the first and second signals to produce a compensative land-groove offset component that is to be fed into a focusing device of the optical storage system so as to enable the focusing device to cancel out the land-groove offset component of the focusing error signal.

21 Claims, 7 Drawing Sheets

METHOD AND DEVICE FOR CANCELING A LAND-GROOVE OFFSET COMPONENT OF A FOCUSING ERROR SIGNAL IN AN OPTICAL STORAGE SYSTEM

CROSS-REFERENCE TO RELATED APPLICATION

This application claims priority of Taiwanese application no. 093104427, filed on Feb. 23, 2004.

BACKGROUND OF THE INVENTION

1. Field of the Invention

The invention relates to correction of a focusing error signal in an optical storage system, more particularly to a method and device for canceling a land-groove offset component of a focusing error signal in an optical storage system.

2. Description of the Related Art

Figure 1:
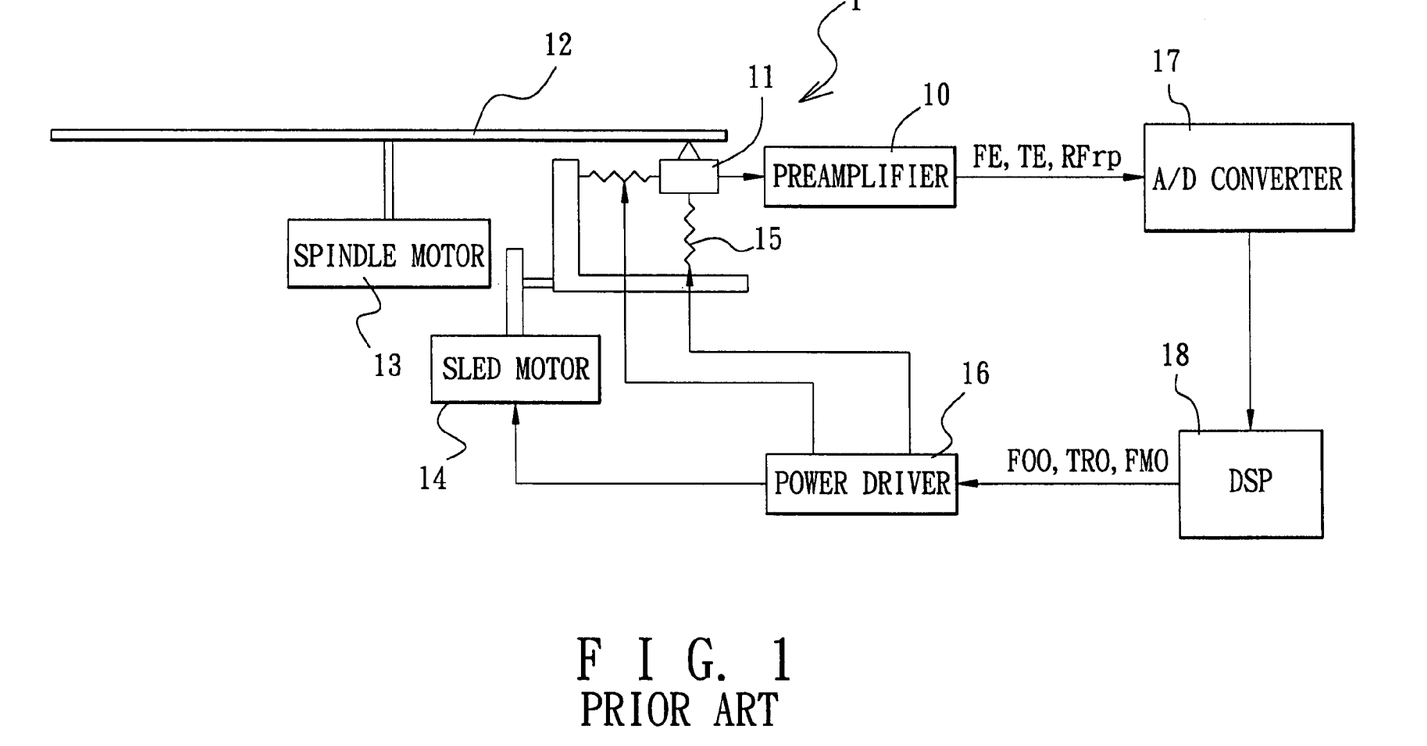
FIG. 1 is a simplified block diagram to illustrate components of a conventional optical storage system.

Referring to FIG. 1, a conventional optical storage system 1 is shown to include an optical pickup 11 for reading data from or recording data into an optical disc 12, a spindle motor 13 for driving rotation of the optical disc 12, a sled motor 14 for driving movement of the optical pickup 11, a focus coil motor 15 associated operably with the optical pickup 11, a preamplifier 10, a power driver 16, an analog-to-digital (A/D) converter 17, and a digital signal processor (DSP) 18. The DSP 18 is operable so as to control the focus coil motor 15 via focusing servo control information.

The optical pickup 11 includes a light source, an object lens, and a photo detector. When the optical storage system 1 reads data, a main beam from the light source is focused on the optical disc 12 through the object lens. The light beam reflected by the optical disc 12 is detected by the photo detector through the object lens. With the change in focused position, for instance, the groove 121, the land 122, or different data states 123 in the groove 121, the amount of reflected light varies accordingly. The photo detector detects the reflected light, and converts the same into electrical signals having corresponding voltage values (or electrical current values). The electrical signals from the photo detector are processed by the preamplifier 10 and the A/D converter 17 prior to receipt thereof by the DSP 18.

Figure 2:
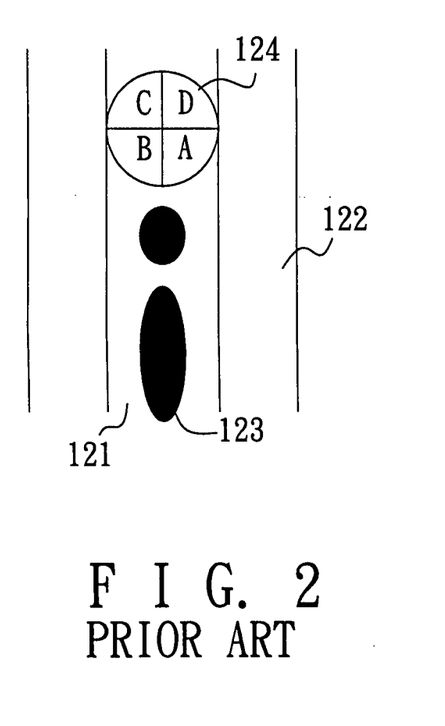
FIG. 2 is a schematic diagram to illustrate a light spot focused in a groove of an optical disc.

Therefore, data recorded in the optical disc 12 and associated servo control information will be converted into electrical signals through the optical pickup 11 that are subsequently provided to the preamplifier 10. The output signal of the preamplifier 10 includes a radio frequency signal (RF) that is an indication of the data read from the optical disc 12, and a focusing error signal (FE) that is an indication of the focusing error. The radio frequency signal (RF) will be decoded by the optical storage system 1 to determine the content of the data read from the optical disc 12. On the other hand, the focusing error signal (FE) will be processed by the DSP 18 to generate a focusing control signal (FOO) In response to the focusing control signal (FOO), the power driver 16 controls operation of the focus coil motor 15 to adjust the position of the object lens so as to correct the focused light spot on the optical disc 12. As shown in FIG. 2, the disc reflected signal may be divided into four regions (A), (B), (C) and (D), corresponding to four regions (A), (B), (C) and (D) of the photo detector of the optical pickup 11. The preamplifier 10 generates the focusing error signal (FE) from the reflected signals. One example of the FE signal is FE=(A+C)−(B+D). Therefore, the DSP 18 is operable to determine whether or not the light beam is accurately focused based on the numerical value of the focusing error signal (FE) and, when the numerical value of the focusing error signal (FE) is non-zero, provides the focusing control signal (FOO) to the power driver 16 such that the power driver 16 controls operation of the focus coil motor 15 to adjust the position of the object lens accordingly. The aforesaid feedback control operation performed by the optical storage system 1 through the focusing error signal (FOO) is commonly known as focusing servo control. In addition, the optical storage system 1 is also operable to generate other forms of servo control, such as track locking servo control, track seeking servo control, etc. Thus, the preamplifier 10 further generates a tracking error signal (TE) and a radio frequency ripple signal (Rfrp) or a wobble ripple signal so as to enable the DSP 18 to perform the other types of servo control.

Figure 3:
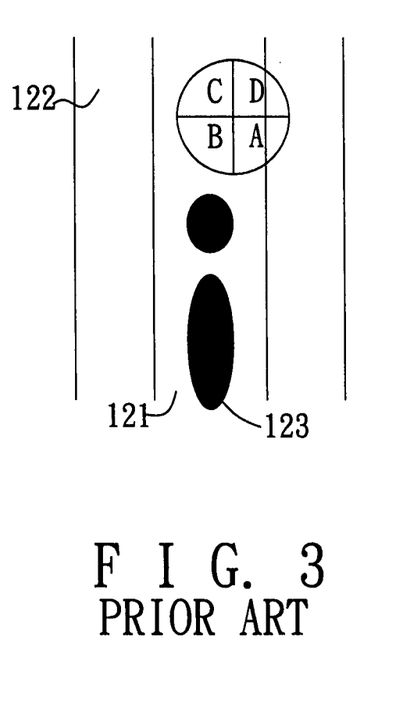
FIG. 3 is a schematic diagram to illustrate a light spot focused on an optical disc during a track crossing operation under ideal conditions.

It is noted that current recordable optical discs, such as CD-R, CD-RW, DVD-RAM, DVD±R, DVD±RW, etc., are designed to include wobble signals (sinusoidal wobbling of the land) that carry timing information. As a matter of fact, the reflected amounts of light from the groove 121 and the land 122 vary inherently. Therefore, when a track is being crossed by the focused spot 1, the amounts of reflection detected in the regions (A), (B), (C), (D) of the photo detector will fluctuate. Under an ideal condition, the line that separates regions (B) and (C) from regions (A) and (D) of the photo detector should be parallel to the boundary of the groove 121 and the land 122, as best shown in FIG. 3, such that fluctuations in the reflected amounts of light during track crossing do not influence generation of the focusing error signal (FE) because regions (A) and (D) always have the same fluctuations, and their effect is minimized in the formation of the focusing error signal (FE).

Figure 4:
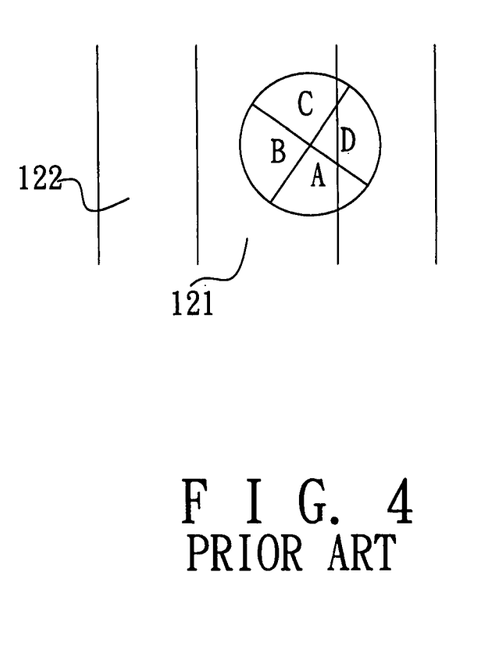
FIG. 4 is a schematic diagram to illustrate a light spot focused on an optical disc during a track crossing operation under actual conditions.

However, in practice, due to manufacturing factors, such as PDIC assembly errors, wobbling of the land-groove boundary, etc., the line that separates regions (B) and (C) from regions (A) and (D) of the photo detector is seldom parallel to the boundary of the groove 121 and the land 122, as shown in FIG. 4. As a result, during track crossing, the focusing error signal (FE) is always superimposed by a land-groove offset component. The presence of the land-groove offset component is evident in case of a track seeking operation, where the land 122 and the grooves 121 are continuously crossed. Therefore, during the track crossing operation, the focusing error signal (FE) fluctuates such that the DSP 18 normally makes an incorrect conclusion as to the presence of improper focusing of the optical pickup 11. As a result, the DSP 18 varies the focusing control signal (FOO) in order to compensate for the superimposed focusing error, i.e., the land-groove offset, as shown in FIG. 5. However, since there is actually no problem with the focusing position, the DSP 18 merely generates a series of meaningless control signals for driving the focus coil motor 15 to perform unnecessary adjustments, which not only does not yield any beneficial effect, but also results in waste of energy and harmful heat.

Figure 5A:
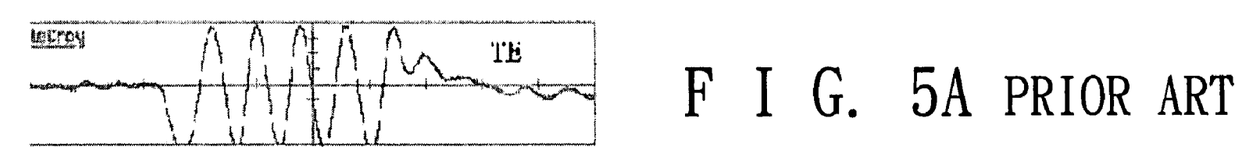
FIGS. 5A to 5D are time charts to illustrate a tracking error signal (TE), a focusing error signal (FE), a radio (or wobble) frequency ripple signal (Rfrp), and a focusing control signal (FOO) generated by the conventional optical storage system.
Figure 5B:
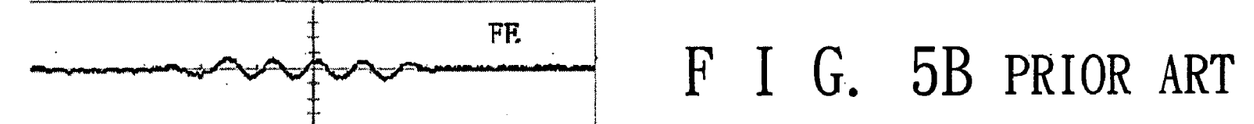
Figure 5C:
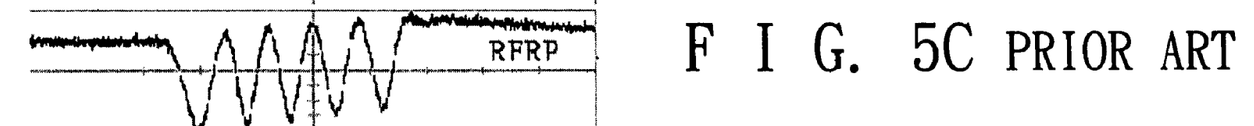
Figure 5D:
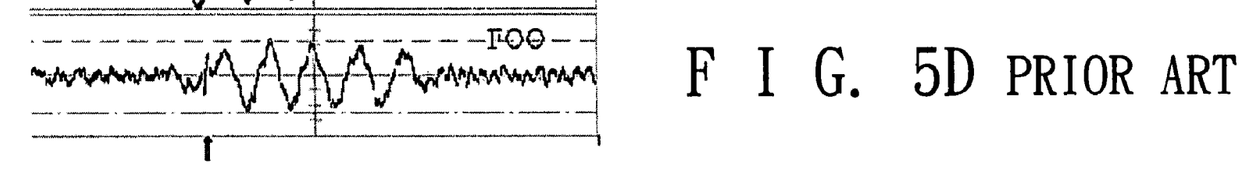

For further details, referring to FIGS. 5A to 5D, when the optical storage system 1 performs track crossing, an increase in the amplitude of the tracking error signal (TE) (see FIG. 5A) and in the amplitude of the focusing error signal (FE) (as shown in FIG. 5B) due to the effect of the land-groove offset component results in an increase in the amplitude of the focusing control signal (FOO) (see FIG. 5D) from the DSP 18. The increase in the amplitude of the focusing control signal (FOO) can result in saturation and subsequent lock-off condition of the servo loop, which affects the stability of focusing control during track seeking and limits the allowable frequency bandwidth for focusing control. On the other hand, for long periods of track seeking operations, since large land-groove offset components are present in the focusing error signal (FE) due to continuous track crossings, the power driver 16 outputs control currents to the focus coil motor 15 continuously for relatively long periods of time, which heats up the focus coil motor 15, thereby shortening the service life and affecting the reliability of the same.

Therefore, to solve the aforesaid problem, many techniques have been proposed heretofore to lower the output for focusing control during track crossing in an optical storage system 1. For example, in U.S. Pat. No. 4,747,089, there is disclosed a method and apparatus for canceling a land-groove offset component of a focusing error signal in an optical storage system by: detecting the focusing error signal synchronously with a tracking error signal to produce a first periodic function signal; detecting the focusing error signal synchronously with an RF signal to produce a second periodic function signal; converting the tracking error signal into a sine wave signal; converting the RF signal into a cosine wave signal; multiplying the first periodic function signal by the cosine wave signal to produce a first component signal; multiplying the second periodic function signal by the sine wave signal to produce a second component signal; and adding the first and second component signals to produce a disturbance signal that is to be subtracted from the focusing error signal to cancel the land-groove offset component therefrom. The scheme proposed in U.S. Pat. No. 4,747,089 is disadvantageous in that it involves a complex architecture to perform complex calculations and is thus costly to implement.

In U.S. Pat. No. 5,199,011, there is disclosed another apparatus for canceling a land-groove offset component of a focusing error signal in an optical storage system. In the proposed apparatus, a filtered calibration focusing error signal is generated during a calibration phase of an optical disc drive, and a correction factor signal is generated from the filtered calibration focusing error signal as a function of a tracking error signal. The correction factor signal is then used to modify the focusing error signal to cancel the land-groove offset component therefrom. The apparatus proposed in U.S. Pat. No. 5,199,011 is disadvantageous in that generation of the correction factor signal requires a large amount of memory space and sampling operations that are relatively difficult to implement.

SUMMARY OF THE INVENTION

Therefore, the object of the present invention is to provide a method and apparatus for canceling a land-groove offset component of a focusing error signal in an optical storage system that can overcome the aforesaid drawbacks associated with the prior art.

According to one aspect of the present invention, there is provided a method for canceling a land-groove offset component of a focusing error signal in an optical storage system. The optical storage system includes an optical pickup for providing the focusing error signal, a radio (or wobble) frequency ripple signal, and a tracking error signal. The optical storage system further includes a focusing device responsive to the focusing error signal for focusing a light spot in position on an optical disc. The method comprises the steps of:

a) processing the radio (or wobble) frequency ripple signal to obtain a first processed signal that is multiplied by a first gain value ($G_1$) so as to result in a first signal;

b) processing the tracking error signal to obtain a second processed signal that is multiplied by a second gain value ($G_2$) so as to result in a second signal;

c) adding the first and second signals to produce a compensative land-groove offset component; and d) feeding the compensative land-groove offset component into the focusing device to enable the focusing device to cancel out the land-groove offset component of the focusing error signal.

According to another aspect of the present invention, there is provided a device for canceling a land-groove offset component of a focusing error signal in an optical storage system. The optical storage system includes an optical pickup for providing the focusing error signal, a radio (or wobble) frequency ripple signal, and a tracking error signal. The optical storage system further includes a focusing control device for reducing the focusing error signal when focusing on an optical disc. The device comprises first and second circuits, and an adder. The first circuit processes the radio (or wobble) frequency ripple signal to obtain a first processed signal that is multiplied by a first gain value ($G_1$) so as to result in a first signal. The second circuit processes the tracking error signal to obtain a second processed signal that is multiplied by a second gain value ($G_2$) so as to result in a second signal. The adder is coupled to the first and second circuits, and adds the first and second signals to produce a compensative land-groove offset component that is to be fed into the focusing device to enable the focusing device to cancel out the land-groove offset component of the focusing error signal.

According to yet another aspect of the present invention, there is provided an optical storage system that comprises an optical pickup, a focusing device, and a canceling device. The optical pickup provides a focusing error signal, a radio (or wobble) frequency ripple signal, and a tracking error signal. The focusing device is coupled to the optical pickup, and is responsive to the focusing error signal for focusing a light spot in position on an optical disc. The canceling device is coupled to the optical pickup and the focusing device, calculates a compensative land-groove offset component from the radio (or wobble) frequency ripple signal and the tracking error signal, and feeds the result into the focusing device, thereby enabling the focusing device to cancel out the land-groove offset component of the focusing error signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Since the radio (or wobble) frequency ripple signal (Rfrp) has approximately a 90-degree phase difference with the tracking error signal (TE), it is assumed herein that: (1) the tracking error signal (TE) can be represented by a cosine signal (as in Equation 1); and (2) the radio frequency ripple signal (Rfrp) can be represented by a sine signal (as in Equation 2).

$$TE = \cos(\omega t) \quad \text{Equation 1}$$

$$Rfrp = \sin(\omega t) \quad \text{Equation 2}$$

In FIG. 5, since the focusing error signal (FE) and the tracking error signal (TE) have the same frequency but with a phase difference therebetween during track crossing, the land-groove offset component ($FE_{LGoffset}$) of the focusing error signal (FE) can be determined as follows:

$$\begin{aligned}
FE_{Lgoffset} &= A \times FE, \text{ where } A \text{ is a constant} \quad \text{Equation 3}\\
&= A \times \sin(\omega t + \Phi), \text{ where } \Phi \text{ is the phase}\\
&\quad \text{difference between FE and TE}\\
&= A \times (\sin\omega t \times \cos\Phi + \cos\omega t \times \sin\Phi)\\
&= A \times (Rfrp \times \cos\Phi + TE \times \sin\Phi)\\
&= G_1 \times Rfrp + G_2 \times TE
\end{aligned}$$

It is evident from Equation 3 that the land-groove offset component ($FE_{LGoffset}$) is composed of the sum of the radio (or wobble) frequency ripple signal (Rfrp) multiplied by a first gain value ($G_1$), and the tracking error signal (TE) multiplied by a second gain value ($G_2$).

Figure 6:
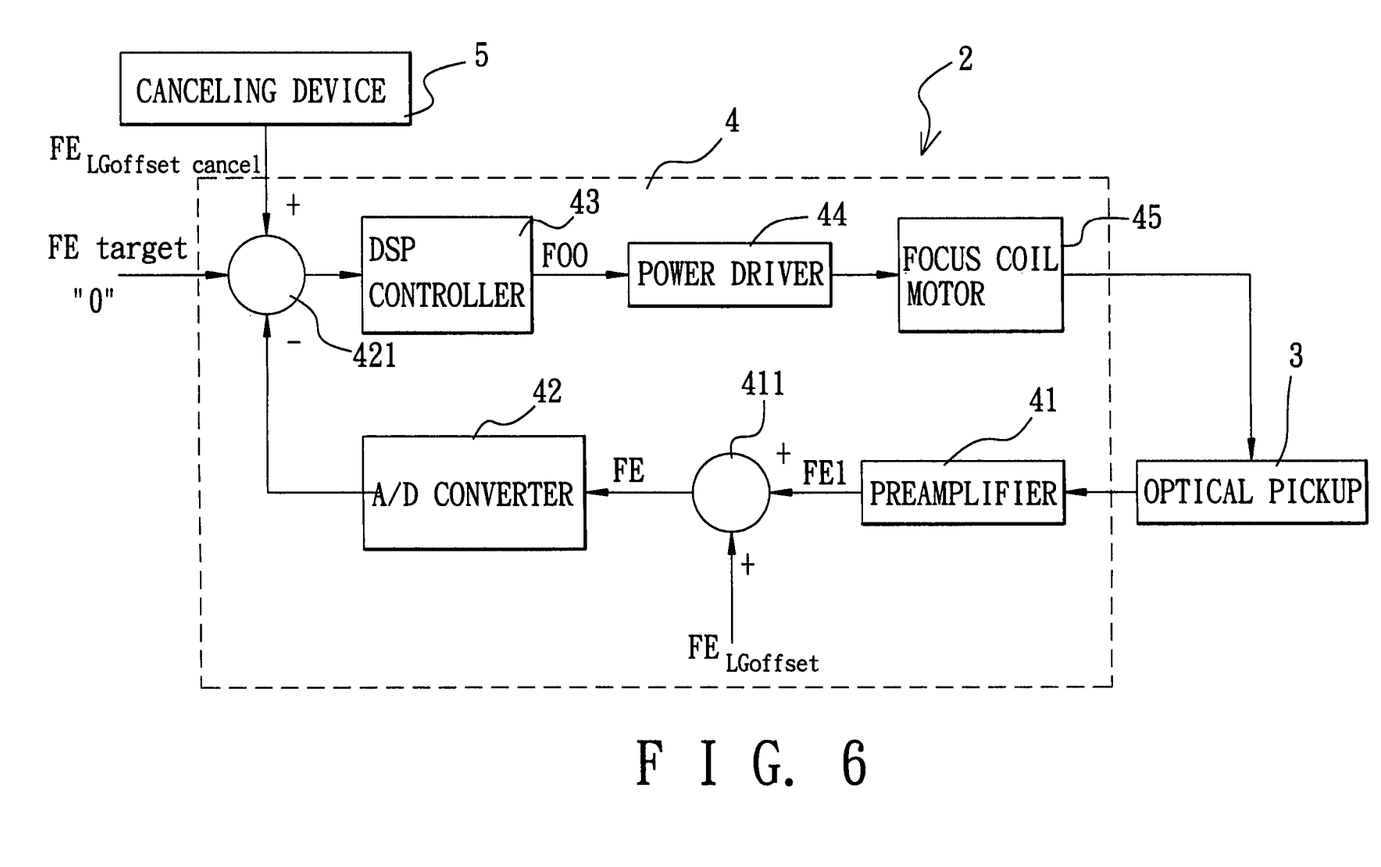
FIG. 6 is a simplified block diagram to illustrate components of the preferred embodiment of an optical storage system according to the present invention.

Referring to FIG. 6, the preferred embodiment of an optical storage system 2 according to the present invention is shown to comprise an optical pickup 3, a focusing device 4, and a canceling device 5.

The optical pickup 3 includes a laser diode, an object lens, and a photo detector. When the optical storage system 2 reads data, a light beam from the laser diode is focused on an optical disc (not shown) through the object lens. The light beam reflected by the optical disc is detected by the photo detector through the object lens. The photo detector generates electrical signals corresponding to the intensity of the detected reflected light that will be formed into the focusing error signal (FE), the radio (or wobble) frequency ripple signal (Rfrp), and the tracking error signal (TE) in a known manner.

The focusing device 4 is coupled to the optical pickup 3, and is responsive to the focusing error signal (FE) for controlling the object lens in the optical pickup 3 in a known manner so as to focus a light spot on the optical disc. The focusing device 4 includes a preamplifier 41 coupled to the optical pickup 3 and outputting the focusing error signal (FE1), an analog-to-digital (A/D) converter 42 for digitizing the focusing error signal (FE), a DSP controller 43 for generating a focusing control signal (FOO) in response to the digitized focusing error signal (FE) from the A/D converter 42, a power driver 44 for generating a drive signal in response to the focusing control signal (FOO) from the controller 43, and a focus coil motor 45 coupled to the power driver 44 and the optical pickup 3 and responsive to the drive signal from the power driver 44 to adjust the object lens of the optical pickup 3 so that the light spot can be focused on an optical disc. It is evident to those skilled in the art that the A/D converter 42 can be omitted by configuring the controller 43 to process the analog focusing error signal (FE) directly.

Moreover, it is evident to those skilled in the art that the optical storage system 2 of this invention further includes other components for tracking servo control, data read/write, etc. Therefore, the aforesaid preamplifier 41 generates the radio (or wobble) frequency ripple signal (Rfrp) and the tracking error signal (TE) to enable the optical storage system 2 to accomplish other basic functions.

Figure 7:
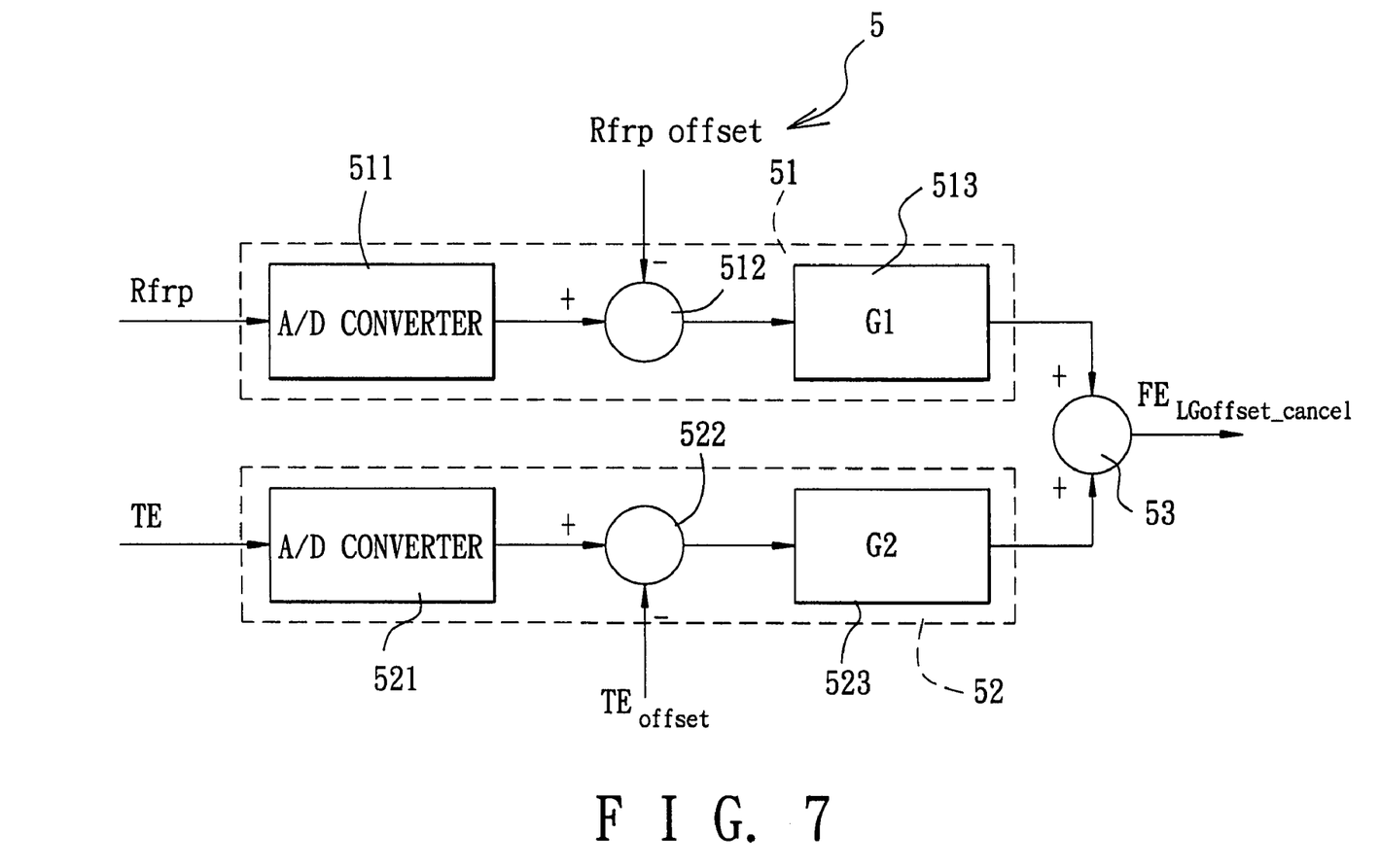
FIG. 7 is a schematic block diagram of a canceling device of the preferred embodiment.

The canceling device 5 is coupled to the optical pickup 3 and the focusing device 4, calculates a compensative land-groove offset component ($FE_{Lgoffset\_cancel}$) of the focusing error signal (FE) from the radio (or wobble) frequency ripple signal (Rfrp) and the tracking error signal (TE), and feeds the compensative land-groove offset component ($FE_{Lgoffset\_cancel}$) into the focusing device 4, thereby enabling the focusing device 4 to cancel out the land-groove offset component ($FE_{LGoffset}$) of the focusing error signal (FE). In this embodiment, the compensative land-groove offset component ($FE_{Lgoffset\_cancel}$) of the focusing error signal (FE) is added into the focusing error signal (FE) by a compensator 421 before the focusing error signal (FE) is fed into the controller 43. As shown in FIG. 7, the canceling device 5 includes a first circuit 51, a second circuit 52, and an adder 53.

The first circuit 51 processes the radio (or wobble) frequency ripple signal (Rfrp) to obtain a first processed signal that is multiplied by the first gain value ($G_1$) so as to result in a first signal. Since the radio (or wobble) frequency ripple signal (Rfrp) from the optical pickup 3 is an analog signal, the first circuit 51 includes an analog-to-digital (A/D) converter 511 for digitizing the radio (or wobble) frequency ripple signal (Rfrp). The first circuit 51 further includes a bias removing unit 512 coupled to the A/D converter 511 for removing direct current bias components (Rfrp offset) from the digitized radio (or wobble) frequency ripple signal (Rfrp) so as to result in the first processed signal. The first circuit 51 additionally includes a first gain unit 513 coupled to the bias removing unit 512 for multiplying the first processed signal by the first gain value ($G_1$).

The second circuit 52 processes the tracking error signal (TE) to obtain a second processed signal that is multiplied by the second gain value ($G_2$) so as to result in a second signal. The second circuit 52 likewise includes an A/D converter 521, a bias removing unit 522, and a second gain unit 523. The A/D converter 521 digitizes the tracking error signal (TE). The bias removing unit 522 is coupled to the A/D converter 521 for removing direct current bias components ($TE_{offset}$) from the digitized tracking error signal (TE) so as to result in the second processed signal. The second gain unit 523 is coupled to the bias removing unit 522 for multiplying the second processed signal by the second gain value ($G_2$).

The adder 53 is coupled to the first and second circuits 51, 52, and adds the first and second signals to produce the compensative land-groove offset component ($FE_{LGoffset\_cancel}$) that is to be fed into the focusing device 4 so as to enable the focusing device 4 to cancel out the land-groove offset component ($FE_{LGoffset}$) of the focusing error signal (FE).

Since the radio (or wobble) frequency ripple signal (Rfrp), the tracking error signal (TE), and the direct current bias components (Rfrp offset, $TE_{offset}$) are widely applied in existing optical storage systems and are thus known to those skilled in the art, they will not be described further herein for the sake of brevity.

It is evident to those skilled in the art that the A/D converters 511, 521 can be omitted from the first and second circuits 51, 52 by configuring the canceling device 5 to process the analog radio (or wobble) frequency ripple signal (Rfrp) and the analog tracking error signal (TE) such that the compensative land-groove offset component ($FE_{Lgoffset\_cancel}$) is generated in an analog form. The analog compensative land-groove offset component ($FE_{Lgoffset\_cancel}$) is then fed into a compensator 411 of the focusing device 4 between the preamplifier 41 and the A/D converter 42. Moreover, if the focusing device 4 is designed for analog signal processing, the compensative land-groove offset component ($FE_{LGoffset\_cancel}$) can be fed into any suitable node of the focusing device 4 prior to the controller 43, and should not be limited to the actual configuration of this embodiment.

Figure 8:
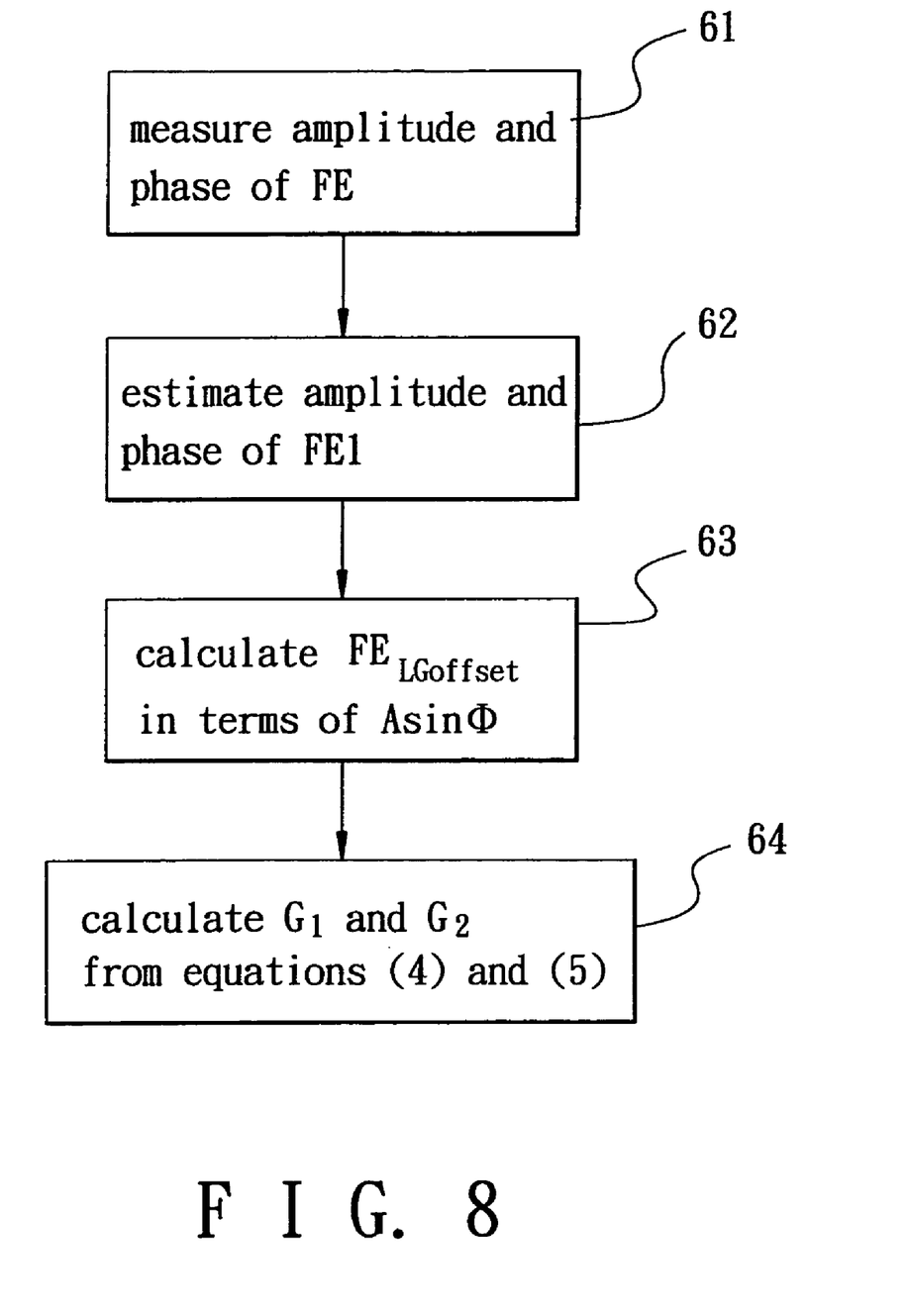
FIG. 8 is a flowchart to illustrate the gain calculating process of the canceling device.

There are many methods available to obtain the first and second gain values ($G_1$), ($G_2$). FIG. 8 shows one example. In particular, FIG. 8 is a flowchart to illustrate operation of a gain calculating process of the canceling device 5. The first and second gain values ($G_1$), ($G_2$) can be calculated in terms of the amplitude (A) and phase (Φ) of the land-groove offset component ($FE_{LGoffset}$), as indicated in the following Equations 4 and 5:

$$G_1 = A \times \cos \Phi \qquad \text{Equation 4}$$

$$G_2 = A \times \sin \Phi \qquad \text{Equation 5}$$

Therefore, the gain calculating process of the canceling device 5 of this embodiment first measures the amplitude (A) and phase (Φ) of the land-groove off set component ($FE_{LGoffset}$) in order to determine the first and second gain values ($G_1$), ($G_2$).

In this embodiment, calculation of the first and second gain values ($G_1$), ($G_2$) is performed by a gain calculating module of the canceling device 5, upon signal calibration stage of the optical storage system 2, in the following manner:

First, in step 61, the amplitude and phase of the focusing error signal (FE) during track crossing are measured as reference to the tracking error signal (TE).

Next, in step 62, since $FE=FE1+FE_{LGOFFSET}$, if we can estimate the FE1 signal, the land-groove offset component ($FE_{LGOFFSET}$) can be easily obtained as FE-FE1. It is evident to those skilled in the art that the frequency response of the various components of the focusing device 4 is usually measured before the whole system is built. Thus, with a pre-established look-up table, the amplitude and phase of FE1 can be easily estimated from the measured signal FE, such that $FE_{LGOFFSET}$ can be estimated in the next step 63.

Then, in step 63, an amplitude (A) and a phase (Φ) difference between $FE_{LGOFFSET}$ and the tracking error signal (TE) are calculated.

Finally, the first and second gain values ($G_1$), ($G_2$) of the first and second gain units 513, 523 are calculated with reference to the amplitude (A) and the phase (Φ) using Equations 4 and 5.

The gain calculating module that executes the aforesaid steps 61 to 64 can be realized using either software or hardware. In this embodiment, the gain calculating module is realized as a software stored in the optical storage system 2 and executed to calculate the first and second gain values ($G_1$), ($G_2$) upon signal calibration stage of the optical storage system 2. Thereafter, when the optical storage system 2 operates, the software causes the canceling device 5 to retrieve the radio (or wobble) frequency ripple signal (Rfrp) and the tracking error signal (TE) for processing by the first circuit 51, the second circuit 52, and the adder 53 so as to generate the compensative land-groove offset component ($FE_{LGoffset\_cancel}$). However, in other embodiments of this invention, the functions provided in steps 61 to 64 can be also implemented by gain and phase searching method which aims to minimize the focus control signal (FOO) through searching straightly any possible combination set of the first and second gain values ($G_1$), ($G_2$).

Figure 9A:
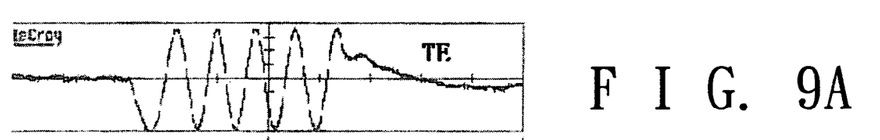
FIGS. 9A to 9D are time charts to illustrate a tracking error signal (TE), a focusing error signal (FE), a radio (or wobble) frequency ripple signal (Rfrp), and a focusing control signal (FOO) generated by the optical storage system of the preferred embodiment.
Figure 9B:
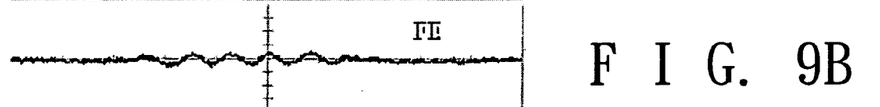
Figure 9C:
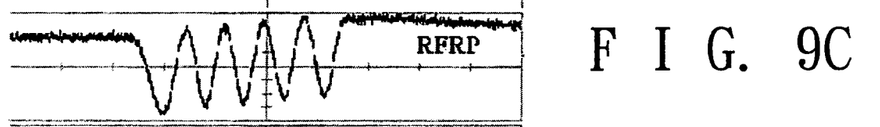
Figure 9D:
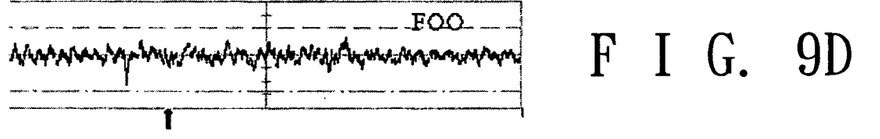

Referring to FIGS. 9A to 9D, when the optical storage system 2 according to this invention performs track crossing, an increase in the amplitude of the tracking error signal (TE) (see FIG. 9A) and in the amplitude of the focusing error signal (FE) (as shown in FIG. 9B) due to the effect of the land-groove offset component does not result in a large increase in the amplitude of the focusing control signal (FOO) (see FIG. 9D), thereby overcoming the aforesaid drawbacks of the prior art.

From the foregoing, when the optical storage system 2 operates, especially during track crossing, the canceling device 5 having a relatively simple configuration generates the compensative land-groove offset component ($FE_{LGoffset\_cancel}$) from the radio (or wobble) frequency ripple signal (Rfrp) and the tracking error signal (TE), and subsequently feeds the same into the focusing device 4 so as to enable the latter to cancel the land-groove offset component ($FE_{LGoffset}$) of the focusing error signal (FE). As a result, the amplitude of the focusing control signal (FOO) that is outputted by the controller 43 is lower as compared to the prior art, thereby increasing stability during track seeking and allowing a larger frequency bandwidth for focusing control. On the other hand, since the land-groove offset component ($FE_{LGoffset}$) of the focusing error signal (FE) is effectively canceled, and since the focusing control signal (FOO) that is outputted by the controller 43 is lower, the aforesaid risk of overheating of the focus coil motor 45 that may arise during long periods of use can be reduced, thereby prolonging the service life and improving the reliability of the focus coil motor 45.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for canceling a land-groove offset component of a focusing error signal in an optical storage system, the optical storage system including
   an optical pickup for providing the focusing error signal, a radio (or wobble) frequency ripple signal, and a tracking error signal, and a focusing device responsive to the focusing error signal for focusing a light spot in position on an optical disc, said method comprising the steps of:

a) processing the radio (or wobble) frequency ripple signal to obtain a first processed signal that is multiplied by a first gain value ($G_1$) so as to result in a first signal;

b) processing the tracking error signal to obtain a second processed signal that is multiplied by a second gain value ($G_2$) so as to result in a second signal;

c) adding the first and second signals to produce a compensative land-groove offset component; and d) feeding the compensative land-groove offset component into the focusing device to enable the focusing device to cancel out the land-groove offset component of the focusing error signal.

2. The method as claimed in claim 1, further comprising the step of:

e) calculating the first and second gain values ($G_1$), ($G_2$) from the focusing error signal upon signal calibration stage of the optical storage system.

3. The method as claimed in claim 2, wherein step e) includes the sub-steps of:

e-1) measuring amplitude and phase of the focusing error signal as reference to the tracking error signal;

e-2) obtaining amplitude and phase of a simulated focusing error signal derived from a system frequency response curve that is resident in the focusing device;

e-3) calculating the land-groove offset component from e-1) and e-2) in terms of an amplitude (A) and a phase ($\Phi$); and e-4) calculating the first and second gain values ($G_1$), ($G_2$) with reference to the amplitude (A) and the phase ($\Phi$).

4. The method as claimed in claim 3, wherein, in sub-step e-4), $G_1 = A*\cos(\Phi)$, and $G_2 = A*\sin(\Phi)$.

5. The method as claimed in claim 1, wherein, in steps a) and b), the radio (or wobble) frequency ripple signal and the tracking error signal may be replaced by any other two signals of the same frequency but with difference phase and amplitude.

6. The method as claimed in claim 1, wherein, in steps a) and b), the radio (or wobble) frequency ripple signal and the tracking error signal are processed by removing direct current bias components therefrom prior to multiplication with the respective one of the first and second gain values ($G_1$), ($G_2$).

7. A device for canceling a land-groove offset component of a focusing error signal in an optical storage system, the optical storage system including an optical pickup for providing the focusing error signal, a radio (or wobble) frequency ripple signal and a tracking error signal, and a focusing device responsive to the focusing error signal for focusing a light spot in position on an optical disc, said device comprising:

a first circuit for processing the radio (or wobble) frequency ripple signal to obtain a first processed signal that is multiplied by a first gain value ($G_1$) so as to result in a first signal;

a second circuit for processing the tracking error signal to obtain a second processed signal that is multiplied by a second gain value ($G_2$) so as to result in a second signal; and an adder, coupled to said first and second circuits, for adding the first and second signals to produce a compensative land-groove offset component that is to be fed into the focusing device to enable the focusing device to cancel out the land-groove offset component of the focusing error signal.

8. The device as claimed in claim 7, further comprising a gain calculating module for calculating the first and second gain values ($G_1$), ($G_2$) from the focusing error signal upon signal calibration stage of the optical storage system.

9. The device as claimed in claim 8, wherein said gain calculating module includes:

a first unit for measuring amplitude and phase of the focusing error signal as reference to the tracking error signal;

a second unit for obtaining amplitude and phase of a simulated focusing error signal derived from a system frequency response curve that is resident in the focusing device;

a third unit for calculating a land-groove offset component from outputs of said first and second units in terms of an amplitude (A) and a phase ($\Phi$); and a fourth unit for calculating the first and second gain values ($G_1$), ($G_2$) with reference to the amplitude (A) and the phase ($\Phi$) from said third unit.

10. The device as claimed in claim 9, wherein calculations performed by said fourth unit include $G_1 = A*\cos(\Phi)$, and $G_2 = A*\sin(\Phi)$.

11. The device as claimed in claim 7, wherein said first circuit includes a first gain unit for multiplying the first processed signal by the first gain value ($G_1$), and said second circuit includes a second gain unit for multiplying the second processed signal by the second gain value ($G_2$).

12. The device as claimed in claim 11, wherein each of said first and second circuits further includes an analog-to-digital converter for digitizing the respective one of the radio (or wobble) frequency ripple signal and the tracking error signal prior to multiplication with the respective one of the first and second gain values ($G_1$), ($G_2$).

13. The device as claimed in claim 11, wherein each of said first and second circuits further includes a bias removing unit for removing direct current bias components from the respective one of the radio (or wobble) frequency ripple signal and the tracking error signal prior to multiplication with the respective one of the first and second gain values ($G_1$), ($G_2$).

14. An optical storage system comprising:

an optical pickup for providing a focusing error signal, a radio (or wobble) frequency ripple signal, and a tracking error signal;

a focusing device coupled to said optical pickup and responsive to the focusing error signal for focusing a light spot in position on an optical disc; and a canceling device coupled to said optical pickup and said focusing device, said canceling device calculating a compensative land-groove offset component for the focusing error signal from the radio (or wobble) frequency ripple signal and the tracking error signal, and feeding the compensative land-groove offset component into said focusing device, thereby enabling said focusing device to cancel out the land-groove offset component of the focusing error signal.

15. The optical storage system as claimed in claim 14, wherein said canceling device includes:

a first circuit for processing the radio (or wobble) frequency ripple signal to obtain a first processed signal that is multiplied by a first gain value ($G_1$) so as to result in a first signal;

a second circuit for processing the tracking error signal to obtain a second processed signal that is multiplied by a second gain value ($G_2$) so as to result in a second signal; and an adder, coupled to said first and second circuits, for adding the first and second signals to produce the compensative land-groove offset component.

16. The optical storage system as claimed in claim 15, wherein said canceling device further includes a gain searching module for optimizing the first and second gain values ($G_1$), ($G_2$) from a focusing control signal upon signal calibration stage of the optical storage system.

17. The optical storage system as claimed in claim 16, wherein said gain searching module minimizes the focusing control signal through searching straightly any possible combination set of the first and second gain values ($G_1$), ($G_2$).

18. The optical storage system as claimed in claim 15, wherein said first circuit includes a first gain unit for multiplying the first processed signal by the first gain value ($G_1$), and said second circuit includes a second gain unit for multiplying the second processed signal by the second gain value ($G_2$).

19. The optical storage system as claimed in claim 18, wherein each of said first and second circuits further includes an analog-to-digital converter for digitizing the respective one of the radio (or wobble) frequency ripple signal and the tracking error signal.

20. The optical storage system as claimed in claim 18, wherein each of said first and second circuits further includes a bias removing unit for removing direct current bias components from the respective one of the radio (or wobble) frequency ripple signal and the tracking error signal.

21. The optical storage system as claimed in claim 15, wherein said focusing device includes:

a preamplifier coupled to the optical pickup;

a controller for generating a control signal in response to the focusing error signal from said preamplifier and the compensative land-groove offset component from said adder of said canceling device;

a power driver coupled to said controller and generating a drive signal in response to the control signal from said controller; and a focus coil motor coupled to said power driver and said optical pickup and responsive to the drive signal from said power driver to control focusing of said optical pickup.

* * * * *